Figure 1:
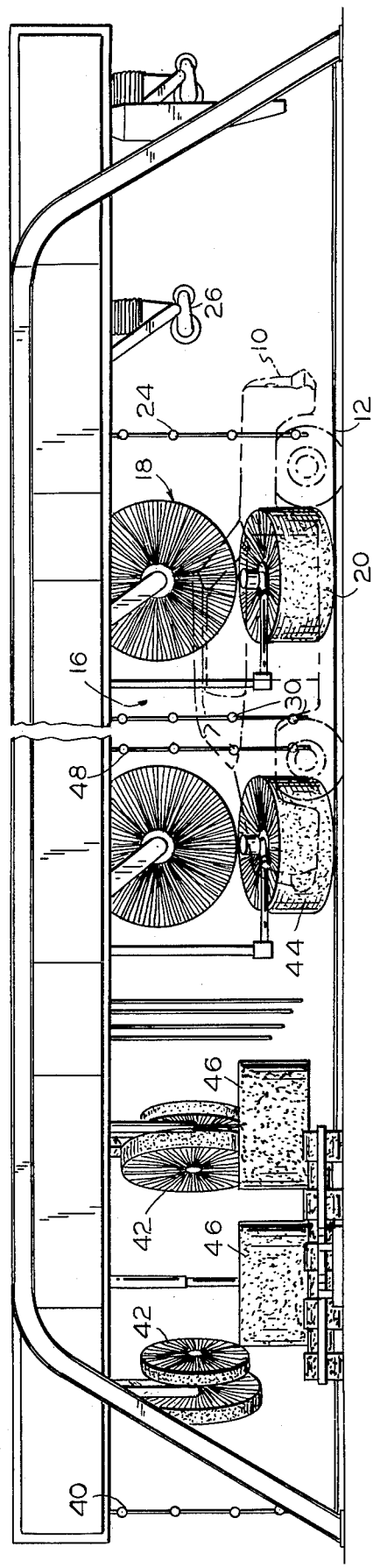

| United States Patent [19] | [11] | 4,015,032 |
|---|---|---|
| Hanna | [45] | Mar. 29, 1977 |

[54] METHOD OF WAXING CARS

[76] Inventor: Daniel C. Hanna, 1133 SW. Rivington Drive, Portland, Oreg. 97201

[22] Filed: Apr. 28, 1975

[21] Appl. No.: 572,093

[52] U.S. Cl. .............................. 427/327; 427/348; 427/355; 427/368

[51] Int. Cl.$^2$ ..................... B05D 1/38; B05D 3/12; B05D 7/14

[58] Field of Search .......... 427/416, 348, 422, 421, 427/368, 327, 355; 106/271

[56] References Cited

UNITED STATES PATENTS

| 2,780,554 | 2/1957 | Lerner | 106/271 X |
|---|---|---|---|
| 3,061,457 | 10/1962 | Brown | 427/368 |
| 3,222,213 | 12/1965 | Clark | 427/348 |
| 3,433,417 | 3/1969 | Poppitz | 239/304 |
| 3,440,063 | 4/1969 | Chestochowski et al. | 106/271 X |
| 3,497,365 | 2/1970 | Atherton et al. | 106/271 X |
| R27,890 | 1/1974 | Holbus | 106/271 X |

*Primary Examiner*—James R. Hoffman
*Attorney, Agent, or Firm*—Klarquist, Sparkman, Campbell, Leigh, Hall & Whinston

[57] ABSTRACT

Brushes and sprays wash and rinse cars and foam wax then is sprayed on the cars and is buffed by a top brush and side brushes, immediately after which a sealing wax in an aqueous solution is sprayed onto the cars. Then the cars are passed through a blower, which removes the excess aqueous solution.

7 Claims, 2 Drawing Figures

METHOD OF WAXING CARS

DESCRIPTION

This invention relates to improved methods of and apparatus for waxing cars, and has for an object thereof the provision of new and improved methods of and apparatus for waxing cars.

Another object of the invention is to provide a method of an apparatus for applying a foam wax to a car and polishing the wax while still wet.

A further object of the invention is to provide a method of and apparatus for applying an aqueous foam wax to a car, polishing the wax and then applying a hard, sealing wax of the self-polishing type to the car.

Figure 2:
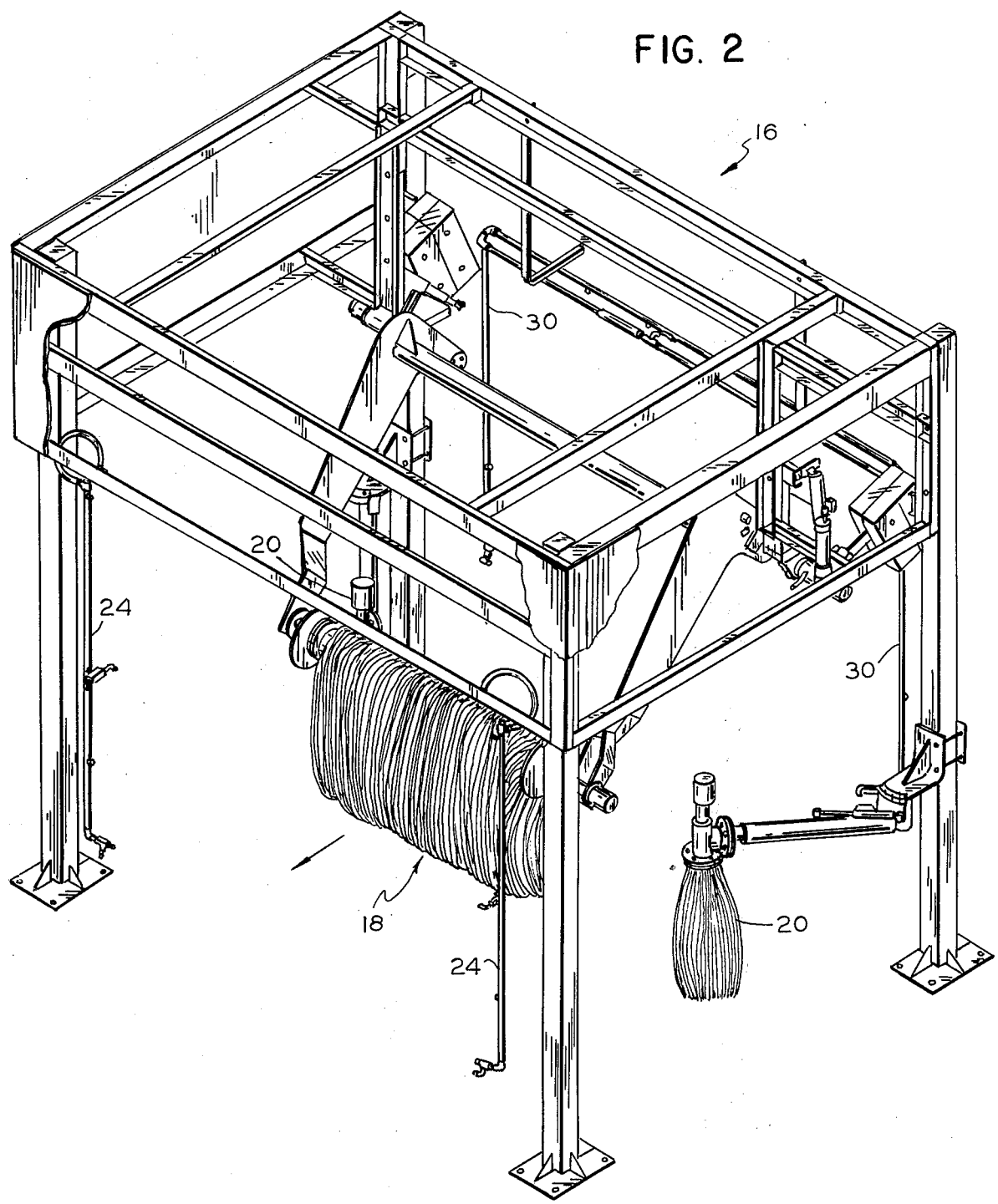

In the drawings:

FIG. 1 is a side elevation view of an apparatus forming one embodiment of the invention and adapted to perform a method forming one embodiment of the invention; and FIG. 2 is an enlarged, perspective view of a portion of the apparatus of FIG. 1.

Referring now in detail to the drawings, there is shown therein an apparatus forming one embodiment of the invention and adapted to effect a method forming one embodiment of the invention. Cars 10 are advanced continuously by a conveyor 12 past known soaping, brushing and rinsing apparatus 14 to and through a foam wax applicator 16, a top buffing brush 18 and side buffing brushes 20, a rinsing and sealing wax applicator 24 and a drying blower 26. The cars are cleaned by the apparatus 14 and are wet as they enter the foam wax applicator 16 which directs streams of foamed wax into the front, rear, top and side surfaces of each car to substantially completely cover these surfaces with an aqueous foamed wax which adheres to these surfaces. The car with the foam wax thereon then passes through the buffing brushes which brush the waxed surfaces to polish the wax while wet and remove excess foam wax from the car. After this buffing or polishing, streams of an aqueous rinsing and sealing wax solution are applied to the foam waxed surfaces, and the sealing wax is deposited onto the foam wax on the surfaces to form a somewhat thick, highly glossed, hard, durable wax coating. Water still on the surfaces is blown off by the dryer.

The foam wax and its application may be one of the foam waxes and methods disclosed and claimed in co-pending application, Ser. No. 432,815, filed Jan. 14,1974, and now abandoned, by Judson L. Smith for "FOAMED WAX PROCEDURE". The foam wax is a group of bubbles separated from one another by thin films, the aggregation having a finite static life. The liquid waxes which may be used for the foam wax of this invention, are those traditionally used in automatic car washes. These go under a variety of trade names, some of which are "Hot Carnauba Wax"; "Turtle Wax"; "Blue Coral", and many others. However, in general, waxes are defined as a substance having the properties of (a) crystalline to micro-crystalline structure, (b) the capactiy to acquire gloss when rubbed, (c) the capacity to produce paste or jells with suitable solids or when mixed with other waxes, (d) low viscosity at just below the melting point, (e) low solubility in solvents for fats at room temperatures. Waxes are derived from various sources such as minerals, vegetables and synethetic material. However, the most common waxes used in car waxes are vegetable waxes and, more particularly, carnauba waxes which are formed from complex alcohols, hydrocarbons, and resins. Different waxes will react differently to the foaming operation of this process. Therefore, the actual wax used will be a matter of personal choice and preference.

Specific examples of wax and foaming agents used therewith are those marketed by Sun Ray Chemical Corp., 115 East Jackson, Phoenix, Arz., under Sun Glow, Part No. 0024 for the wax, and Part No. 0023 for the foaming agent. In a preferred embodiment of this invention, these are used in proportions of one part of wax, one part of foaming agent, to fifty parts of water. It is believed that under some circumstances, the foaming agent can be varied from one-tenth of a part to two pats, per part of wax, per 50 parts of water. The proportion of water used, can be decreased from fifty parts, but the performance is not significantly improved, if improved at all, and the cost is significantly increased.

The foam wax applicator may include a pressurized tank with an aqueous mixture of wax, water and foaming agent therein, or it may include an unpressurized tank and an ejector apparatus employing the "Dema" type ejector, mixes wax with water and adds compressed air in a foaming chamber. Also, the nozzles 30 may be foaming nozzles. The foam wax when formed and applied to the automobile or other surface is then stable for a finite period of time, generally slightly less than 10 minutes.

The sealing wax is self-polishing, hard and durable, and is of the type commonly used in car washes wherein it is applied in an aqueous solution and is self-polishing. It is often referred to as a "hot wax". Specific examples of the sealing wax are CW-450 wax concentrate sold by Mt. Hood Chemical Corporation of 4444 N.W. Yeon Ave., Portland, Ore. 97210, and the self-polishing wax concentrate sold by Keystone Corporation of Kansas City, Mo. These was concentrates are mixed with water in a ratio of about ¼ to 2 ounces of the wax concentrate to one gallon of water. Other waxes and solutions which can be used are those disclosed in U.S. Pat. Re. No. 27,890 and U.S. Pat. Nos. 3,222,201; 3,222,213 and 2,626,870. The aqueous solution preferably is hot, being of a temperature of 120° F. or hotter.

By applying the aqueous sealing wax to the car while the foam wax is still wet, oxidization of the foam wax is minimized, and the sealing wax may be applied to the nip of the brushes 18 and 20, nozzles 30 directing the streams of sealing rinse water with wax therein onto the car.

The apparatus 14 includes soaping nozzles 40, a top brush 42, side brushes 44, wraparound brushes 46 and water rinsing nozzles 48. Each car is thoroughly washed and rinsed by the apparatus 14 so that it comes to the foam wax applicator 16 clean and wet. The nozzles 30 direct streams of aqueous foaming wax onto the top surfaces of the car and onto the sides of the car below the side windows to foam a layer of foamed wax on these surfaces. The applicator 16 and buffing brushes 18 and 20 are actuated by the car striking position switches, and the brushes 18 and 20 are rotated and are urged toward the car into brushing engagement with the still wet waxed surfaces and buff the wax onto these surfaces. The buffed surfaces are still wet and unoxidized when the rinse water containing the sealing wax is applied to the top and side surfaces of the car. After the car leaves the brushes 18 and 20, the continuously operated dryer nozzles 26 blow off excess water left on the car. The dryer nozzles are directed somewhat rearwardly, and would blow off the foam wax as it is applied if the brushes 18 and 20 were not present. However, the brushes 18 and 20 block the flow of air therepast, and the streams of foam wax being applied and the foam wax layer on the car are not disturbed by the dryer air.

What is claimed is:

1. The method of waxing and polishing cars comprising:
    applying an aqueous emulsion of wax in a foam state to a car,
    polishing the foam wax on the car while wet to form a wet, polished wax coating thereon,
    and applying a self-polishing wax to the wet waxed coating.
2. The method of claim 1 wherein the polishing comprises brushing the foam wax.
3. The method of claim 2 wherein the self-polishing wax is applied to the car in an aqueous emulsion, and including drying the car after the self-polishing wax is applied thereto.
4. The method of claim 1 wherein the self-polishing wax is applied to the car in an aqueous emulsion.
5. The method of waxing a car comprising:
    applying an aqueous emulsion of wax in the form of a foam coating to a car,
    polishing the foam wax coating,
    and applying a hot aqueous emulsion of a wax to the polished coating before the surface of the coating has oxidized.
6. The method of claim 5 including blowing air onto the car to remove excess or the hot aqueous emulsion of wax, and using brushes to polish the foam wax coating and wherein the brushes are interposed between the blowing and the portion of the car having foam thereon to prevent blowing the foam off the car.
7. The method of waxing cars comprising:
    advancing cars one after another along a predetermined path,
    washing, brushing and rinsing the cars along a first portion of the path,
    directing a foamed mixture of wax and water toward each car as it passes a second subsequent portion of the path to form a layer of foam on the car,
    brushing the foam covered car at a third, subsequent portion of the path to polish the wax onto the car,
    and directing a mixture of water and hard, self-polishing wax into the polished wax coating at a fourth, subsequent portion of the path.

* * * * *

UNITED STATES PATENT OFFICE
CERTIFICATE OF CORRECTION

PATENT NO. : 4,015,032
DATED : March 29, 1977
INVENTOR(S) : DANIEL C. HANNA

It is certified that error appears in the above-identified patent and that said Letters Patent are hereby corrected as shown below:

Col. 1, line 10, change "an" to --and--

Col. 1, line 34, change "into" to --onto--

Col. 2, line 15, change "pats" to --parts--

Col. 2, line 37, change "was" to --wax--

Col. 4, line 24, change "into" to --onto--

Signed and Sealed this

Seventh Day of June 1977

[SEAL]

Attest:

RUTH C. MASON
Attesting Officer

C. MARSHALL DANN
Commissioner of Patents and Trademarks